Sept. 5, 1961 W. C. BADDERS 2,998,703
RESO-JET IGNITER
Filed Sept. 11, 1953

INVENTOR
WILLIAM C. BADDERS
BY
ATTORNEYS 2,998,703
RESO-JET IGNITER
William C. Badders, Washington, D.C., assignor to the United States of America as represented by the Secretary of the Navy
Filed Sept. 11, 1953, Ser. No. 379,750
2 Claims. (Cl. 60—35.6)

This invention relates generally to an arrangement for initiating operation of rocket devices. More particularly, the invention relates to a reso-jet igniter for initiating operation of hydrocarbon-fuel jet-assist take-off rockets.

A jet-assist take-off rocket generally comprises a casing having a charge of potassium perchlorate or other suitable means mounted therein in place of the conventional rocket propellant. The fuel component for the rocket is supplied by a hydrocarbon compound, such as the gasoline carried by the aircraft. Thus, the rocket is not required to carry its own source of fuel, but only the oxygen source with the result that a jet-assist take-off rocket may be used a number of times before its contents are completely exhausted or used up. It has been found that it is difficult to ignite the fuel in a jet-assist take-off rocket, and that this difficulty can be eliminated by providing heat and pressure.

It is an object of this invention to provide suitable means for initiating operation of jet-assist take-off rockets for aircraft.

It is another object of this invention to provide a reso-jet igniter for providing the proper starting conditions for a hydrocarbon-fueled jet-assist take-off rocket for aircraft.

Still another object of the invention is to provide a reso-jet igniter unit which can be started from a static condition and/or with ram pressure air, and which can be utilized cyclically for intermittent operation.

And another object of this invention is to provide a reso-jet igniter arrangement for a jet-assist take-off rocket which is economical to manufacture, easy to install, and simple and reliable in operation.

Other objects and many of the attendant advantages of this invention will be readily appreciated as the same becomes better understood by reference to the following detailed description, taken in conjunction with the accompanying drawings, and in which.

In accordance with the invention, there is provided, in conjunction with a JATO rocket, a reso-jet igniter unit for initiating operation of the rocket. This igniter unit consists of a starter casing which is attached to the JATO rocket casing, and which has a forward opening for receiving air. A plurality of reed-type valves are provided in the casing for controlling the admission of the air into the reso-jet unit, together with a fuel jet for injecting fuel into the air in the casing. Suitable means, such as a spark plug, are provided for igniting the air-fuel mixture.

Upon ignition of the air-fuel mixture in the reso-jet igniter, a pressure pulse is produced which causes the reed-type valves to close, with the products of combustion liberated upon the burning of the air-fuel mixture escaping through a nozzle of the JATO rocket.

A decrease in pressure is created in the reso-jet casing due to the escaping of the products of combustion, with the result that the reed-type valves again open to admit a new supply of air to the reso-jet casing, which is again mixed with fuel, and the air-fuel mixture is ignited. The cycle referred to above is then repeated. The heat and pressure produced by the products of combustion are utilized to ignite and start the fuel jet in the JATO rocket.

Figure 2:
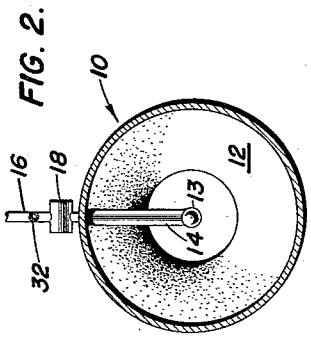
FIG. 2 is a cross section on line 2—2 of FIG. 1.
Figure 3:
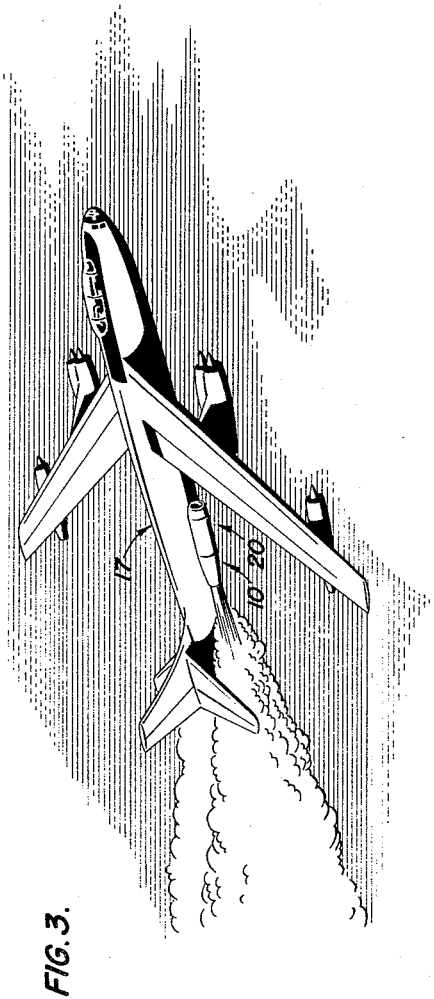
FIG. 3 is a perspective of an aircraft showing a JATO rocket, including the reso-jet igniter unit attached thereto.
Figure 1:
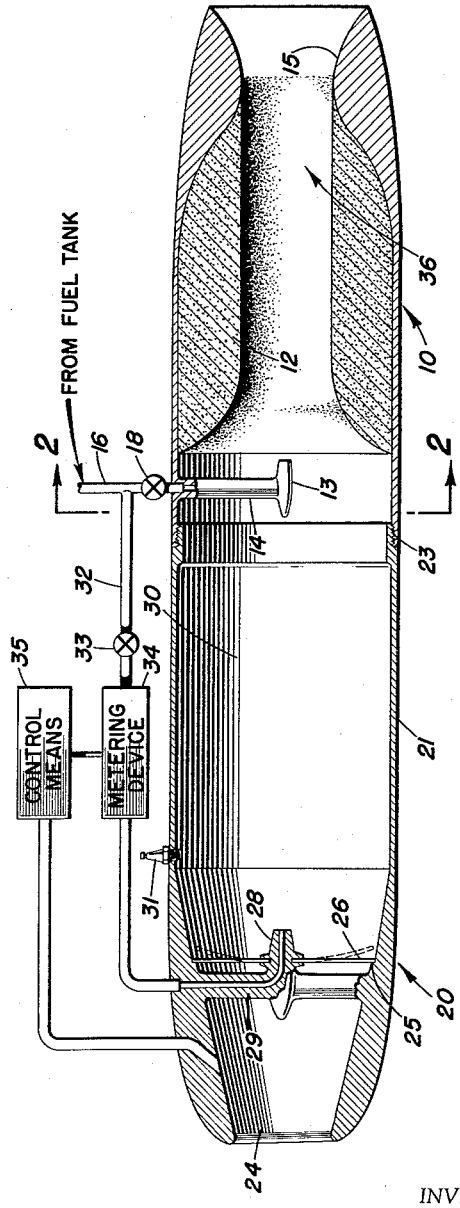
FIG. 1 is an axial section taken through a jet-assist take-off rocket (hereinafter referred to as JATO), including the reso-jet igniter unit.

Referring now to FIG. 1 of the drawings, there is shown a JATO casing 10. This casing 10 contains therein a hollow, substantially cylindrical, block of oxidizing agent 12, which is preferably of potassium perchlorate, the latter being a substance which is high in readily available oxygen. A burner or fuel nozzle 13 is mounted on a combined strut and fuel supply line 14 to direct a jet of hydrocarbon fuel towards an exit nozzle 15. The fuel is supplied to the burner nozzle 13 through a passageway 16 leading to a fuel tank (not shown) of the aircraft 17, with a suitable valve 18 being provided to control and shut off the fuel flow as desired.

A reso-jet igniter unit 20, including a casing 21, is attached to the casing 10 through suitable means, such as a threaded joint 23 or the like. Casing 21 has a forward entrance or opening 24 designed to receive air from the atmosphere. This opening 24 is positioned in the direction of movement of the aircraft 17, which carries the JATO rocket casing 10.

A seat 25 is provided within the casing 21 against which reed-type valves 26 are located.

A fuel nozzle 28, centrally located in the opening in the casing 21, and supported by a hollow strut 29, is provided to direct the fuel rearwardly into the casing 21. The air flowing past the reed-type valves 26 is mixed with the fuel from the nozzle 28, to form a suitable air-fuel mixture in the combustion chamber 30 in casing 21, and this air-fuel mixture is then ignited by suitable means, such as a spark plug 31 or the like. The fuel for the nozzle 28 is supplied from the fuel tank (not shown) of the aircraft 17, through the passageway 16, passageway 32, valve 33, and a suitable metering device 34, which is responsive to a control means 35. The control means 35 are responsive to the air mass flow entering the casing 21 through the entrance 24, and through the hollow strut 29 to the nozzle 28.

In actual operation, the air enters the reso-jet igniter unit 20 through the opening 24 and flows past the reed-type valves 26 into the combustion chamber 30 in casing 21. Fuel is injected into the air stream by means of the nozzle 28. Upon ignition of the air-fuel mixture by means of the spark plug 31, a pressure pulse is produced by the products of combustion or gases escaping through the exit 15 due to the burning of the air-fuel mixture. This pressure pulse causes the reed-type valves 26 to close, whereupon the products of combustion escape through the exit 15 in JATO rocket casing 10.

The pressure produced by the products of combustion cause these products to flow out of the exit nozzle 15, and a reduction of pressure occurs in the combustion chamber 30 located in the casing 21. Due to the fact that the air flowing through the opening 24 is at ambient conditions, the reed-type valves 26 will open to allow a new supply of air to pass into the combustion chamber 30 of the reso-jet unit 20, and a new supply of fuel will be injected into the air stream by the nozzle 28. This new air-fuel mixture is again ignited by the spark plug 31, and the reed valves 26 again will be closed, with a new pressure pulse again being initiated.

A pulsating flow of air and products of combustion is produced through the casings 21 and 10, the rate of pulsation being determined approximately by the resonant sonic frequency of the escape cylinder passageway 36 of the rocket 10. As an example, a pressure of the order of approximately fifteen (15) to thirty (30) pounds per square inch is built up in the combustion chamber 30 in casing 21. The frequency of pulsation may be in the range of 60 to 100 cycles per second. The heat and pressure provided by the reso-jet igniter unit 20 is utilized to ignite the fuel issuing from nozzle 13 and to liberate oxygen by heating the oxidizer 12. The fuel then continues to burn in the oxygen supplied by the potassium perchlorate compound or oxidizer 12.

The combustion process described above will build up a pressure of the magnitude of 1000 to 5000 pounds per square inch in the combustion chamber of the reso-jet igniter 20 and the passageway 36 of the rocket casing 10. This pressure will hold the reed valves 26 closed and will stop any further operation of the reso-jet igniter unit 20. The products of combustion liberated by the burning of the air-fuel mixture in the igniter 20, and the JATO rocket unit will issue from the nozzle 15 and will provide the necessary thrust to lift the aircraft 17.

Obviously many modifications and variations of the present invention are possible in light of the above teachings. It is, therefore, to be understood that within the scope of the appended claims the invention may be practiced otherwise than as specifically described.

What is claimed is:

1. In combination, a rocket having a central passageway, an oxidizer surrounding said passageway, and means for injecting fuel into said passageway; and a reso-jet igniter arrangement arranged in tandem with said rocket and, including a casing having a duct therein, said duct having an entrance and an exit into the passageway of said rocket, a combustion chamber in said duct, a seat at the entrance of said combustion chamber and having means located therein for controlling the admission of air into said combustion chamber, means for injecting fuel into said combustion chamber, and means for igniting the air-fuel mixture in said combustion chamber, whereby the products of combustion liberated due to the burning of said air-fuel mixture ignite and cause continuous burning of the fuel introduced in the passageway of said rocket.

2. In combination, a rocket having a passageway, an oxidizer surrounding said passageway, and means for introducing fuel into said passageway; and a reso-jet igniter arrangement arranged in tandem with said rocket for initiating operation of said rocket, said arrangement including a casing having a duct therein, said duct having an entrance and an exit into said passageway of said rocket, a combustion chamber in said duct, a seat at the entrance of said combustion chamber and having a plurality of reed-type valves located therein for controlling the admission of air into said combustion chamber, means for injecting fuel into said combustion chamber, and means for igniting the air-fuel mixture in said combustion chamber, whereby the products of combustion liberated during the burning of said air-fuel mixture are utilized to initiate burning of the fuel in said rocket passageway to cause continuous operation of said rocket.

References Cited in the file of this patent

UNITED STATES PATENTS

| 2,505,757 | Dunbar et al. | May 2, 1950 |
| 2,544,830 | Grill et al. | Mar. 13, 1951 |
| 2,644,396 | Billman | July 7, 1953 |

FOREIGN PATENTS

| 590,177 | Great Britain | July 10, 1947 |